US008322654B2

(12) United States Patent
Gomes et al.

(10) Patent No.: US 8,322,654 B2
(45) Date of Patent: Dec. 4, 2012

(54) AIRCRAFT GALLEY UNITS

(75) Inventors: Ierko De Magalhães Gomes, São José dos Campos (BR); Jose Celso Bustamante Coura, São José dos Campos (BR)

(73) Assignee: Embraer S.A., São José dos Campos—SP (BR)

( * ) Notice: Subject to any disclaimer, the term of this patent is extended or adjusted under 35 U.S.C. 154(b) by 442 days.

(21) Appl. No.: 12/611,086

(22) Filed: Nov. 2, 2009

(65) Prior Publication Data

US 2011/0101160 A1 May 5, 2011

(51) Int. Cl.
*B64D 13/00* (2006.01)
(52) U.S. Cl. .................................................. 244/118.5
(58) Field of Classification Search .............. 244/118.5, 244/118.6, 129.1, 129.4, 129.5
See application file for complete search history.

(56) References Cited

U.S. PATENT DOCUMENTS

| 6,007,025 | A  | * | 12/1999 | Coughren et al. | 244/118.6 |
| 6,547,183 | B2 | * | 4/2003  | Farnsworth      | 244/118.1 |
| 6,761,332 | B1 | * | 7/2004  | Bengtsson       | 244/118.5 |
| 7,780,114 | B2 | * | 8/2010  | Doebertin et al.| 244/118.5 |
| 2001/0050519 | A1 | * | 12/2001 | Kasuya        | 312/315   |

* cited by examiner

*Primary Examiner* — Tien Dinh
*Assistant Examiner* — Keith L Dixon
(74) *Attorney, Agent, or Firm* — Nixon & Vanderhye P.C.

(57) ABSTRACT

Galley units are provided having a moveable galley structure in the interior aircraft cabin. During passenger ingress/egress and during certain phases of the aircraft's flight (e.g., take-off and landing), the galley structure may be moved so as to be laterally adjacent the main cabin door and thereby provide access to the door. During other phases of the aircraft's flight (e.g., during cruise flight at altitude), the galley structure may be moved laterally so as to cover the main cabin door and thereby provide enhanced acoustic and/or thermal insulation in the main cabin door area. The space vacated by the moveable galley structure may thus expose other galley structures and/or equipment. An aircraft which includes such an aircraft galley unit and methods to achieve acoustic and/or thermal insulation for an aircraft cabin door using such an aircraft galley unit are also provided.

17 Claims, 8 Drawing Sheets

AIRCRAFT GALLEY UNITS

FIELD

The disclosed structures relate generally to aircraft cabins provided with galleys. In especially preferred forms, a galley unit is provided in an aircraft cabin that includes a reciprocally movable galley structure to provide acoustic and/or thermal cabin insulation in relation to an aircraft cabin door. Aircraft comprising such galley units and methods of providing acoustic and/or thermal insulation by means of such galley units are also provided.

BACKGROUND

Aircraft cabins are provided with cabin doors for the purpose of passenger ingress/egress. Aircraft cabin door regions are however a source of acoustic and thermal infiltration into the cabin during flight.

Conventionally curtains and/or secondary interior doors have been two solutions for covering and insulating the aircraft passenger cabin, especially executive aircraft cabins, from external noise and low temperatures outside the cabin through the aircraft's main cabin door.

Providing curtains to cover during flight operations the main aircraft cabin door and the integral stairs (if any) provided with the door is very a simple solution. Curtains are very easily installed but are not very efficient in terms of acoustic and thermal insulation. In addition to this disadvantage, aircraft interior cabin curtains are easily soiled and tend to be rather heavy. Moreover, curtains are rather bulky and thus occupy a meaningful amount of interior cabin space that could be put to better use, especially in smaller executive aircraft cabins.

A secondary door is a more complex solution than curtains. In addition, mounting a secondary door in relation to the aircraft cabin main door is accomplished at a substantial weight penalty since the weight of the secondary door is not insubstantial. Generally, in order to increase insulation effects of a secondary door the thickness of the door must be increased which in turn increases its weight. Thus, providing a secondary door as a solution to enhanced cabin insulation in the main cabin door area is a careful balance between the weight, volume and insulation efficiencies of the secondary cabin door.

It would therefore be especially desirable to enhance an aircraft cabin's acoustic and/or thermal insulation in the area of the main cabin door that minimizes (if not eliminate entirely) many of the problems associated with the conventional solutions described above. It is towards fulfilling such a need that the present invention is directed.

SUMMARY OF EXEMPLARY EMBODIMENTS

Broadly, preferred embodiments are provided in the form of a galley unit having a moveable galley structure in the interior aircraft cabin. During passenger ingress/egress and during certain phases of the aircraft's flight (e.g., take-off and landing), the galley structure may be moved so as to be laterally adjacent the main cabin door and thereby provide access to the door. During other phases of the aircraft's flight (e.g., during cruise flight at altitude), the galley structure may be moved laterally so as to cover the main cabin door and thereby provide enhanced acoustic and/or thermal insulation in the main cabin door area. The space vacated by the moveable galley structure may thus expose other galley structures and/or equipment.

In some preferred embodiments an aircraft galley unit is provided having a fixed-position galley structure mounted laterally adjacent to an aircraft cabin door, and a movable galley structure. The movable galley structure is mounted for reciprocal movements between a stowed position wherein the moveable galley structure is stacked with and covers the fixed-position galley structure and an operative position wherein the movable galley structure is stacked with and covers the aircraft cabin door. In such a manner, the movable galley structure while in its operative position thereby allows access to the fixed-position galley structure and provides the cabin door with acoustic and/or thermal insulation.

The aircraft galley unit in some embodiments will include at least one longitudinally extending guide. Preferably a pair of such guides are provided. The movable galley structure may therefore be mounted to the guide rail(s) for reciprocal longitudinal sliding movements between the stowed and operative positions thereof relative to the longitudinal axis of the aircraft.

In order to assist in such manual reciprocal movements, the aircraft galley unit is preferably provided with handle. According to some embodiments, the handle may include a grab bar protruding outwardly from the movable galley unit and having a pair of hand hold openings to allow the grab bar to be grasped manually. Advantageously, at least one of the hand hold openings may include a latch release trigger operatively associated with a latching mechanism to allow the movable galley structure to be released and slidably moved between its stowed and operative positions.

In certain preferred embodiments, the fixed-position galley structure includes a table that is pivotally foldable between a closed position wherein the table is substantially vertically oriented, and an opened position wherein the table is substantially horizontally oriented. The movable galley structure may thus include in such instances a support boss to support the table and/or a friction lock to releasably lock the table in the opened position thereof.

Aircraft may thus be provided with the aircraft galley unit as described herein as part of its interior galley arrangement.

In other aspects, methods are provided so as to achieve acoustic and/or thermal insulation for an aircraft cabin door. According to preferred embodiments, such methods include positioning an aircraft galley unit as described herein laterally adjacent to the cabin door, and moving the movable galley structure from the stowed position and into the operative position thereof so that the movable galley structure covers the cabin door, whereby the movable galley structure provides acoustic and/or thermal insulation for the cabin door.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
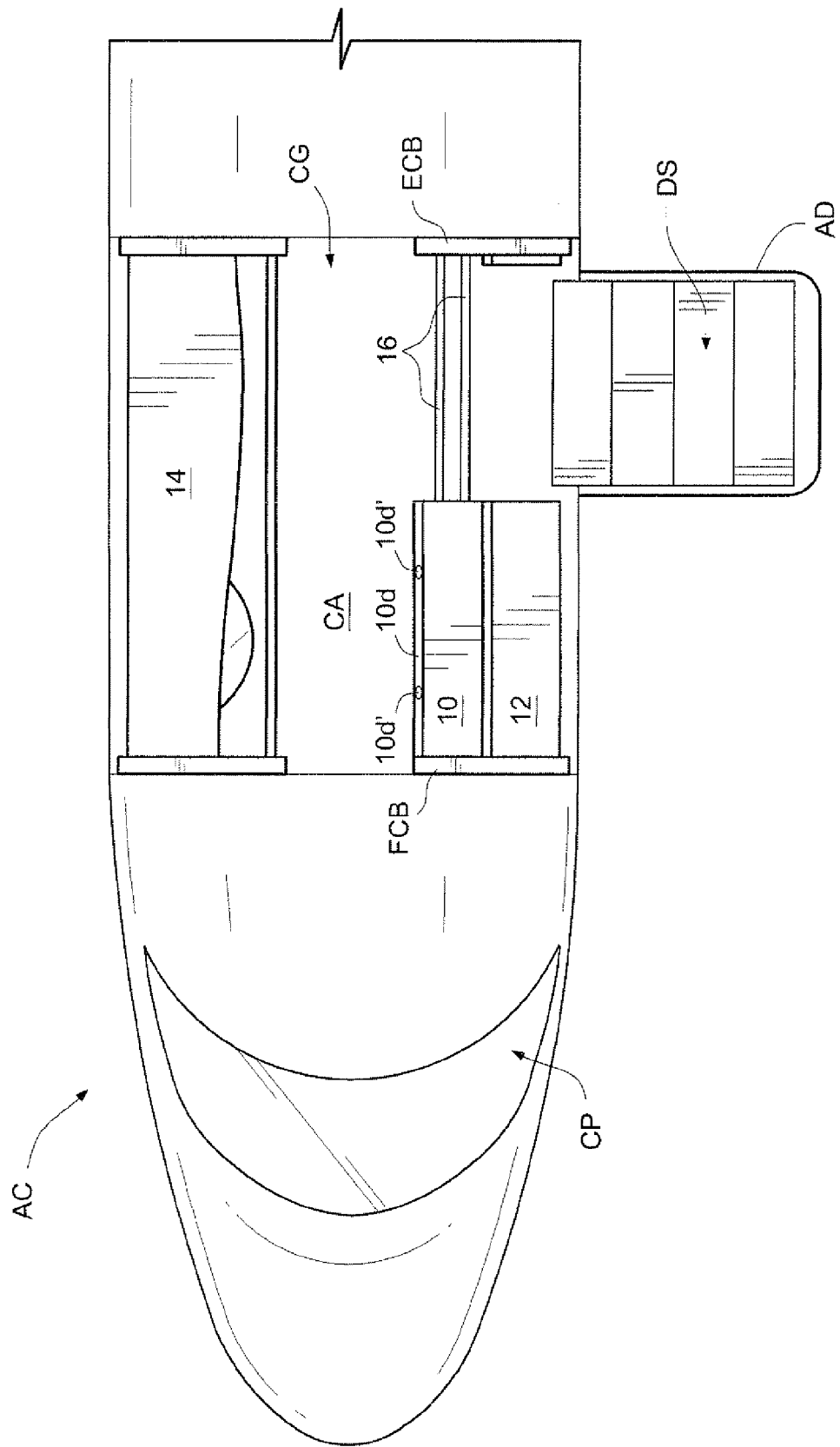
FIG. 1 is a top plan x-ray view of a forward aircraft cabin area including the aircraft galley which includes a movable galley structure which is depicted in a state wherein the movable galley structure is in a stowed position to allow passengers and crew to ingress/egress through the main cabin door.

Accompanying FIG. 1 depicts a forward portion of an aircraft AC showing in an x-ray manner the cabin galley area CG aft of the cockpit CP. As depicted in FIG. 1, the aircraft door AD is in an opened state allowing passengers and crew to board the aircraft AC via the door stairs DS and enter the cabin galley CG. The cabin galley CG as shown in FIG. 1 includes a moveable galley structure 10 and a complementary fixed galley structure 12 in a region laterally adjacent to the aircraft cabin door CD and its integral stairs.

The particular configurations of the galley structures 10 and 12 are not critical. Thus, for example, the galley structures 10 and/or 12 may include a number of cabinets with appropriate cabinet doors or drawers for containing galley-related or other equipment or supplies. As shown, in preferred embodiments, as viewed from the front of the galley structure 10, its front surface contour is most preferably curved upwardly and rearwardly so as to create a visually aesthetically pleasing environment in the cabin galley CG with the impression of spaciousness.

The galley structures 10 and 12 may be positioned opposite to another fixed-position galley structure 14 or other suitable aircraft monument (e.g., table, passenger seat, lavatory and the like) as may be desired by the aircraft owner or operator. The fixed-position galley structure 14 may for example contain conventional galley equipment, such as sink with potable water faucets, microwave and/or convection oven, refrigerator and the like. A cabin aisle CA is thus defined between the galley structures 10, 12 and 14 to allow passengers and crew to move about the aircraft cabin.

Figure 2:
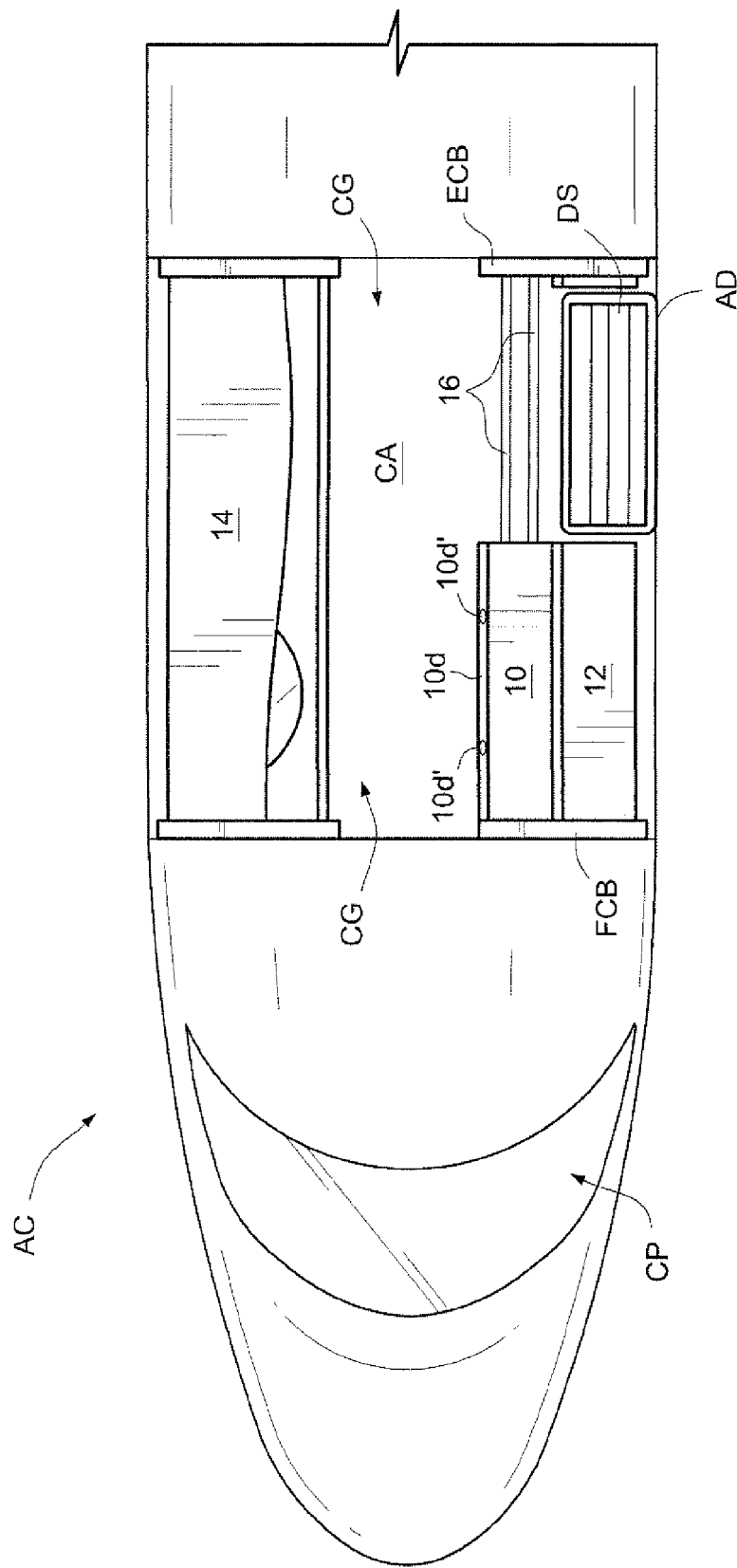
FIG. 2 is a top plan x-ray view similar to FIG. 1 but depicted in a state wherein the main cabin door has been closed for flight operations.
Figure 5:
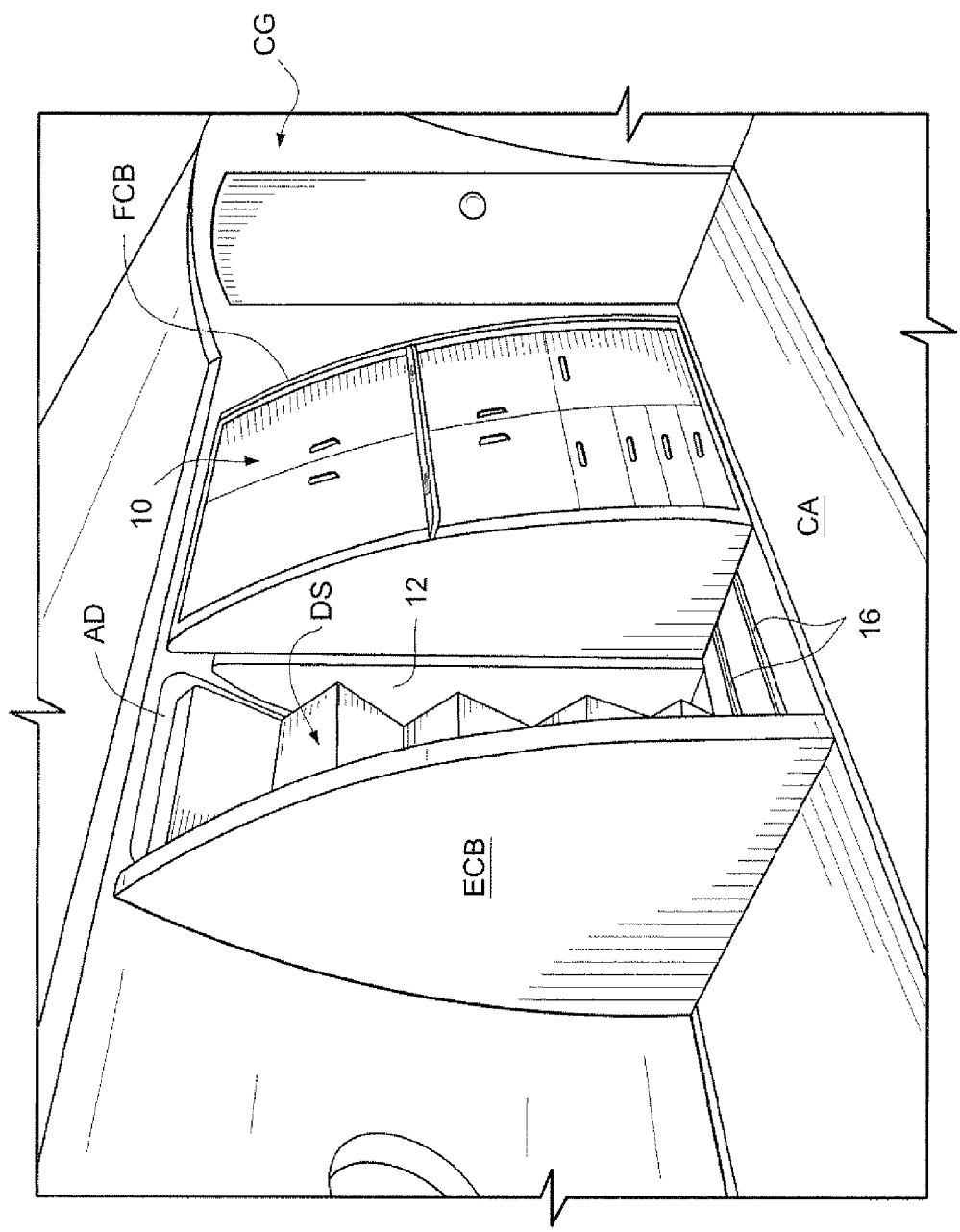
FIG. 5 is a forwardly looking perspective view of a partial aircraft interior cabin space showing the moveable galley structure and the main cabin door as depicted in FIG. 2.

The galley structure 10 is depicted in FIGS. 1, 2 and 5 in a stowed position which is mandated for aircraft take-off, landing and low altitude maneuvering. While in such a stowed position the galley structure 10 will be physically stacked adjacent to and thus cover the galley structure 12. The fixed-position galley structure 12 will therefore be visibly hidden when the movable galley structure 10 is in its stowed position due to its lateral and vertical dimensions. Moreover, while in the stowed position, the galley structure 10, has a lateral dimension which allows the aircraft door AD and its integral stairs DS to be moved into a closed and secured condition for flight operations (see FIGS. 2 and 5).

Figure 3:
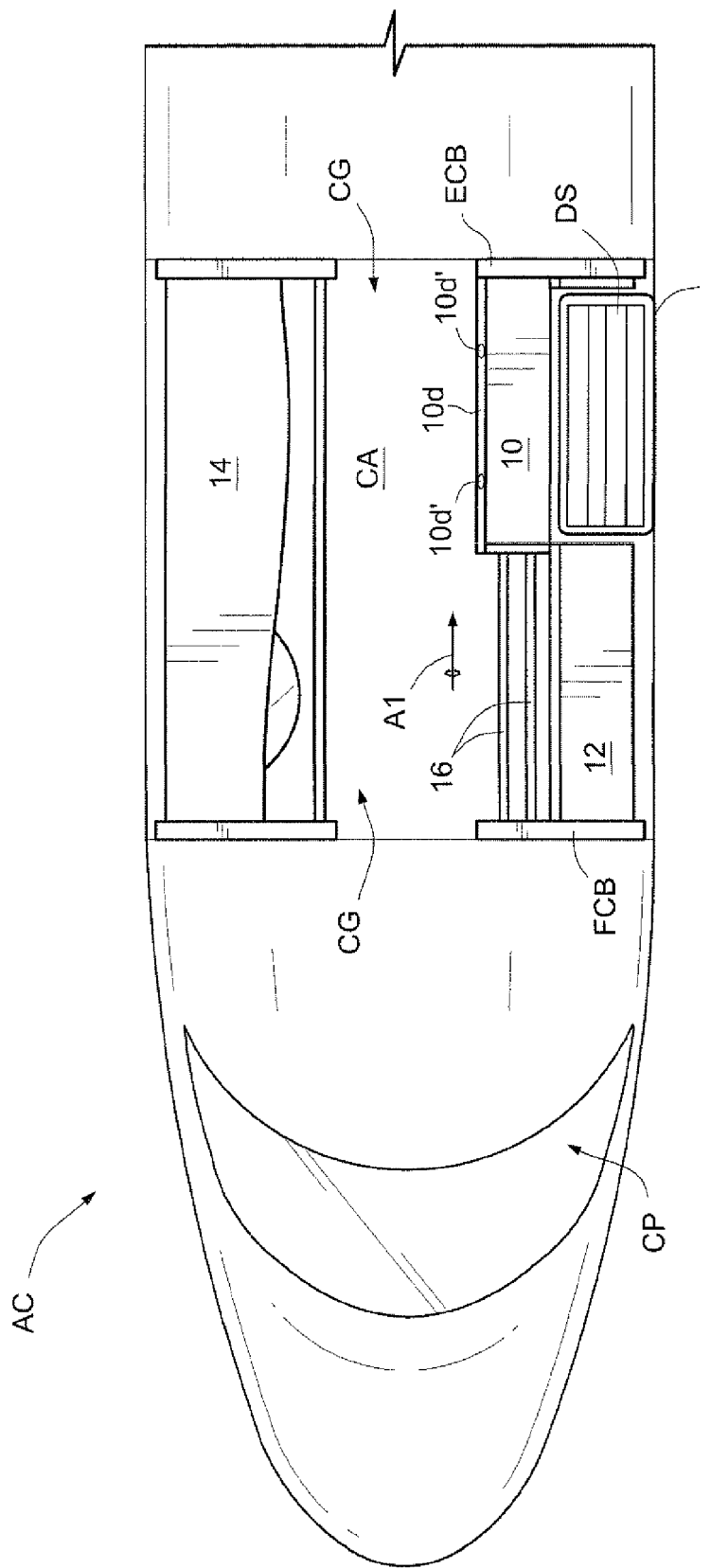
FIG. 3 is a top plan x-ray view similar to FIG. 2 but depicted in a state wherein the movable galley structure has been slidably and laterally moved so as to cover the main cabin door.
Figure 4:
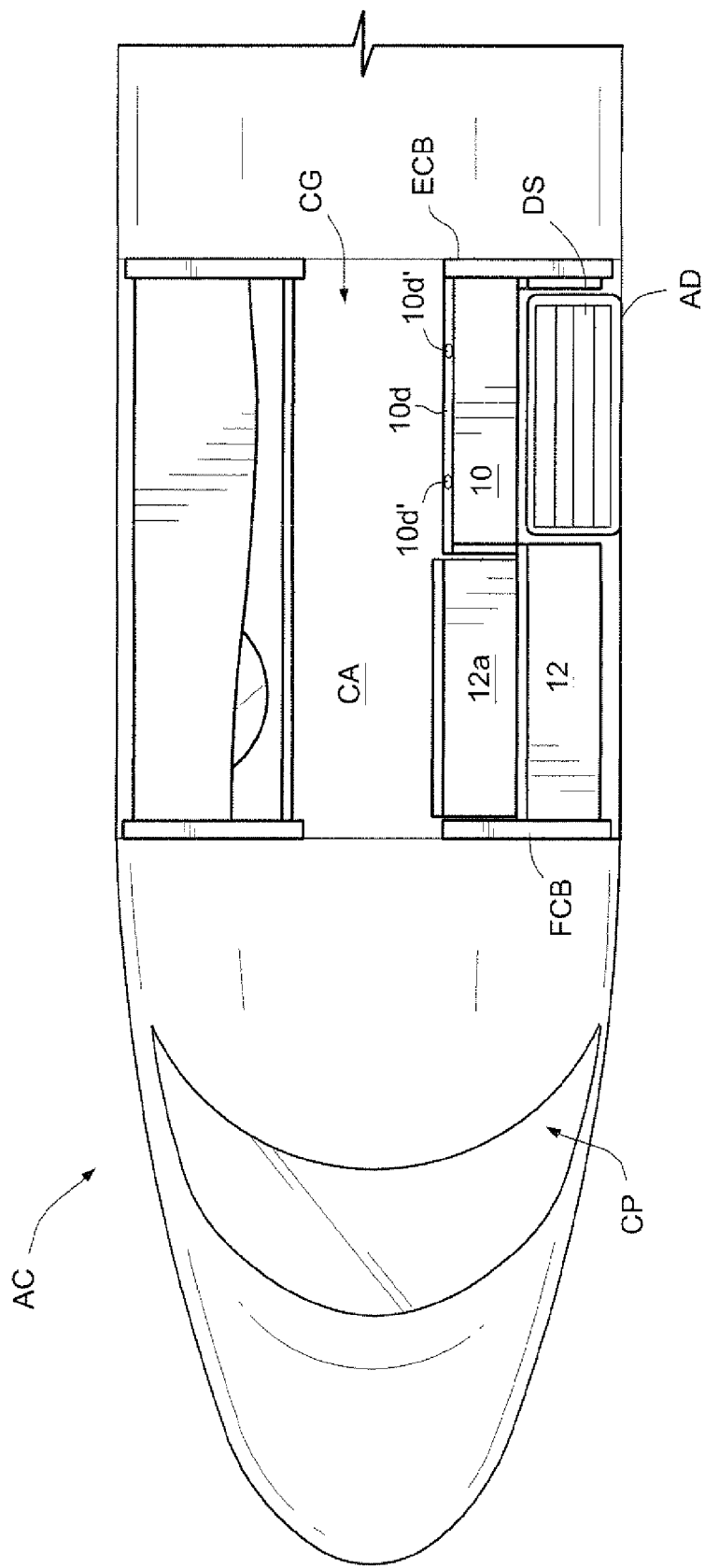
FIG. 4 is a top plan x-ray view similar to FIG. 3 but depicted in a state wherein a foldable galley table exposed by the moveable galley structure has been deployed for use during flight operations.
Figure 6:
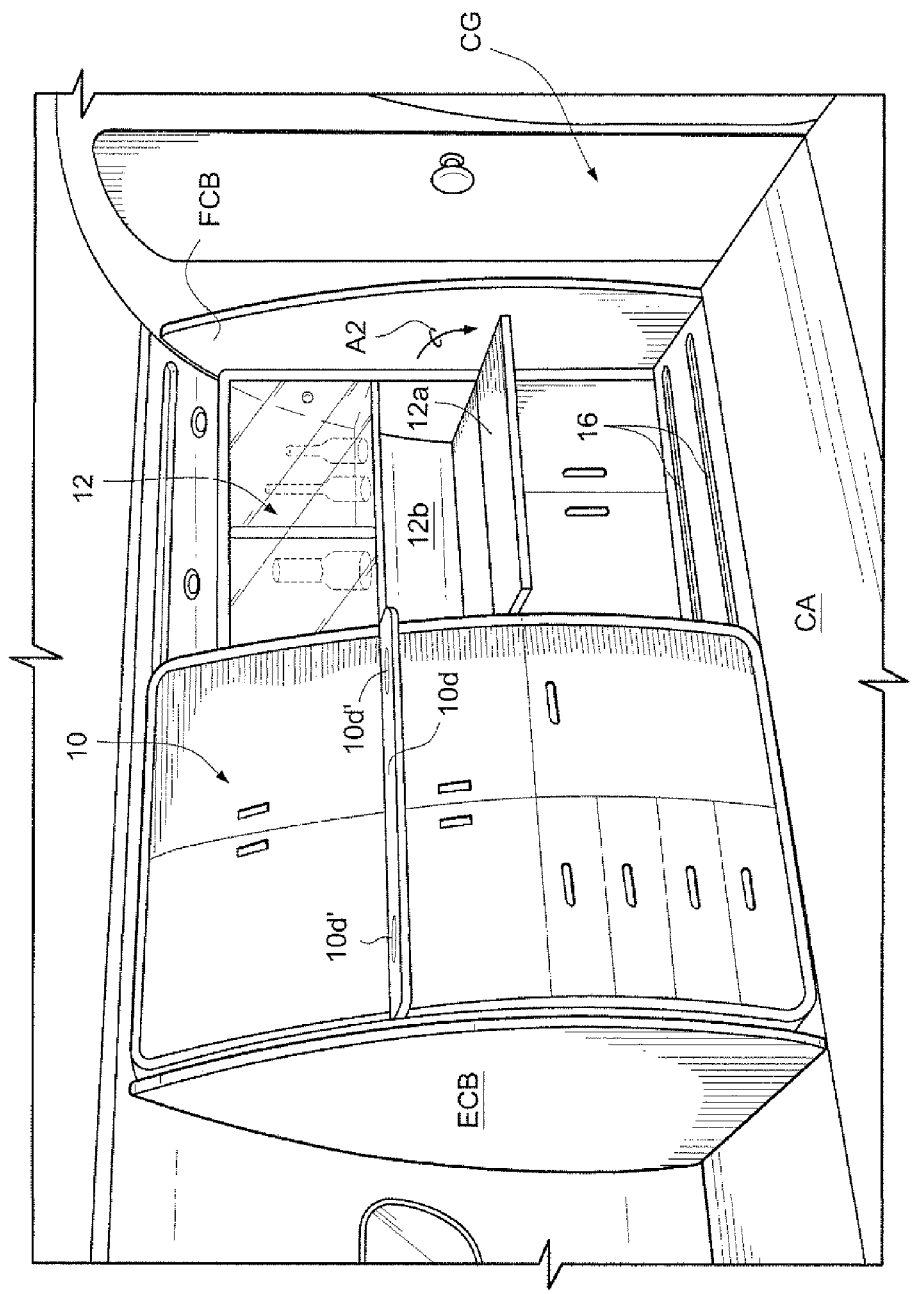
FIG. 6 is a forwardly looking perspective view of a partial aircraft interior cabin space showing the moveable galley structure in an operative position which covers the main cabin door as depicted in FIG. 3.

As shown in FIGS. 3 and 6, once the aircraft door AD has been closed and secured for flight operations, and the aircraft has assumed a sufficient altitude where in-flight cabin service may safely begin, the galley structure 10 may be unlatched from its stowed position and translated laterally (arrow A1 in FIG. 3) on its guide rails 16 to a position wherein it is physically adjacent the entry cabin bulkhead ECB and covers the aircraft door AD and its integral stairs DS. The galley structure 12 may include suitable rollers (not shown) operatively engaged with the guide rails 16 to facilitate its lateral movement between its stowed and operative positions.

While the galley structure 10 is in its operative position, it will therefore acoustically and thermally insulate the region of the aircraft cabin in the vicinity of the main aircraft cabin door AD. In addition, while the galley structure 10 is in its operative position, the fixed-position galley structure 12 and its associated component units may be accessed. This position of the galley structure 10 also allows the aircraft cabin aisle CA to be visibly wider in the galley area GA and moreover will allow the cabinet doors associated with the fixed-position galley structure to be capable of fully opening without diminishing the cabin aisle CA space.

Figure 7:
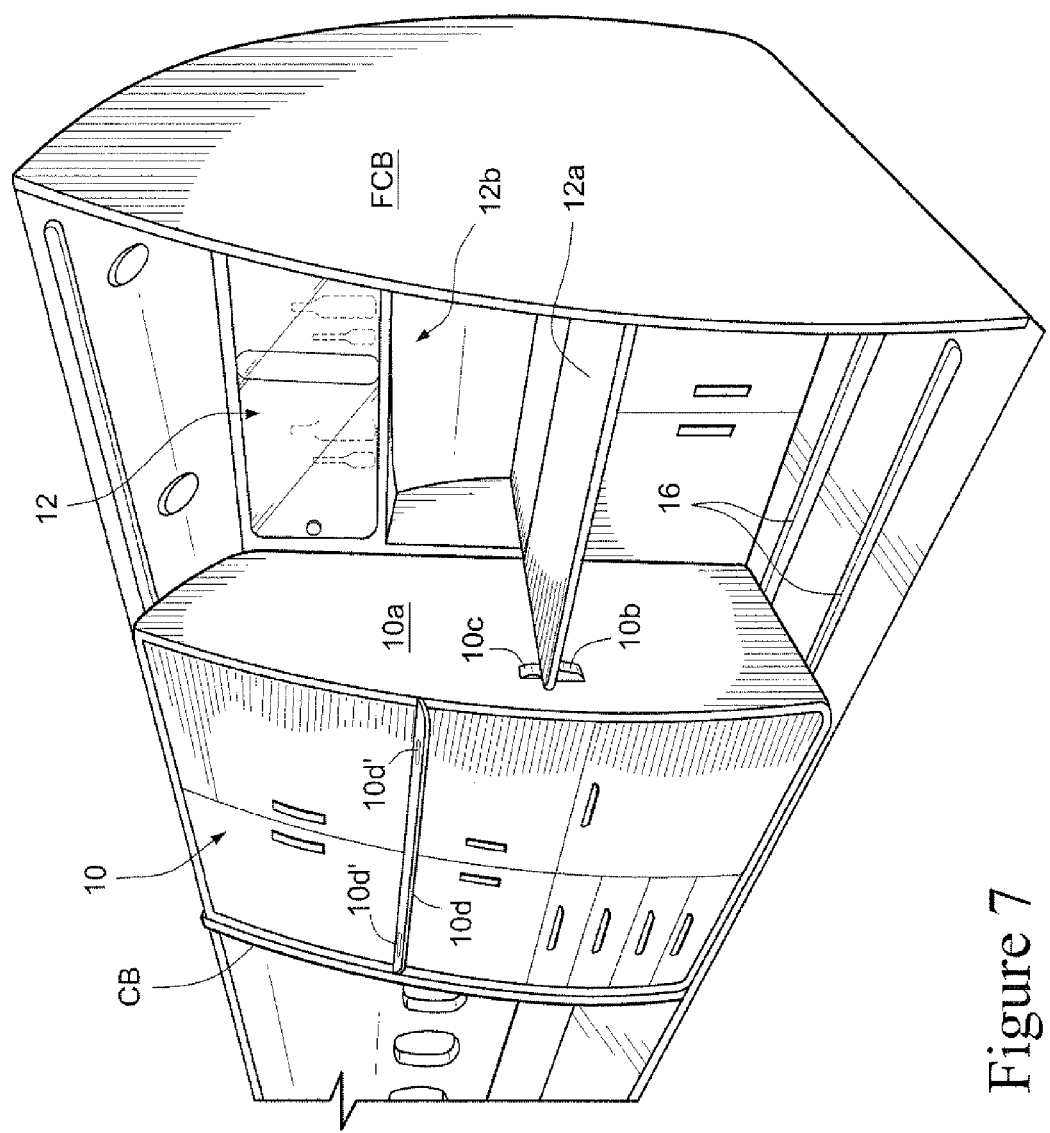
FIG. 7 is a rearwardly looking perspective view of a partial aircraft interior cabin space showing the moveable galley structure and the foldable table in a position in an operative position as depicted in FIG. 4.

According to some embodiments, the galley structure 12 may be provided with a foldable table unit 12a that can be folded (arrow A2 in FIG. 6) from its closed position (i.e., a position wherein the table unit 12a is positioned essentially vertically disposed to allow the movable galley structure 10 to be moved into its stowed position) to an opened position (i.e., a position wherein the table unit 12a is essentially horizontally disposed to allow it to function as a table and allow access to the cabinet space 12b). In this regard, as shown in FIG. 7, the forward panel 10a of the galley structure 10 may include a support boss 10b with a friction lock 10c to respectively structurally support and lock the table unit 12a while in its opened position. While in its opened position, the table unit 12a will also positionally lock the movable galley structure 10 in its operative position so it does not inadvertently translate back to its stowed position (e.g., in case in-flight turbulence is encountered).

In order to assist in the manual movement reciprocal sliding movement of the galley structure 10 between its stowed and operative positions, it is preferred that an elongate grab bar 10d protruding outwardly from and extending the lengthwise of (relative to the longitudinal dimension of the aircraft AC) the galley structure 10. The grab bar 10d may be provided with hand hold openings 10d' as shown so as to facilitate the manual grasping and physical movement of the galley structure 10. Any other suitable handle structure may be provided to assist with such a function.

When it is desired to return the movable galley structure 10 to its stowed position from its operative position, the table 12a is pivotally folded into its closed position (i.e., in a direction opposite to arrow A2 in FIG. 6). With the table 12a closed, the galley structure 10 may be manually slidably moved along the guide rails into its stowed position (i.e., in a direction opposite to arrow A1 in FIG. 3) thereby once again exposing the main aircraft cabin door AD and its integral stairs DS. As such, passengers and crew may disembark the aircraft AC when the door AD is opened.

Figure 8:
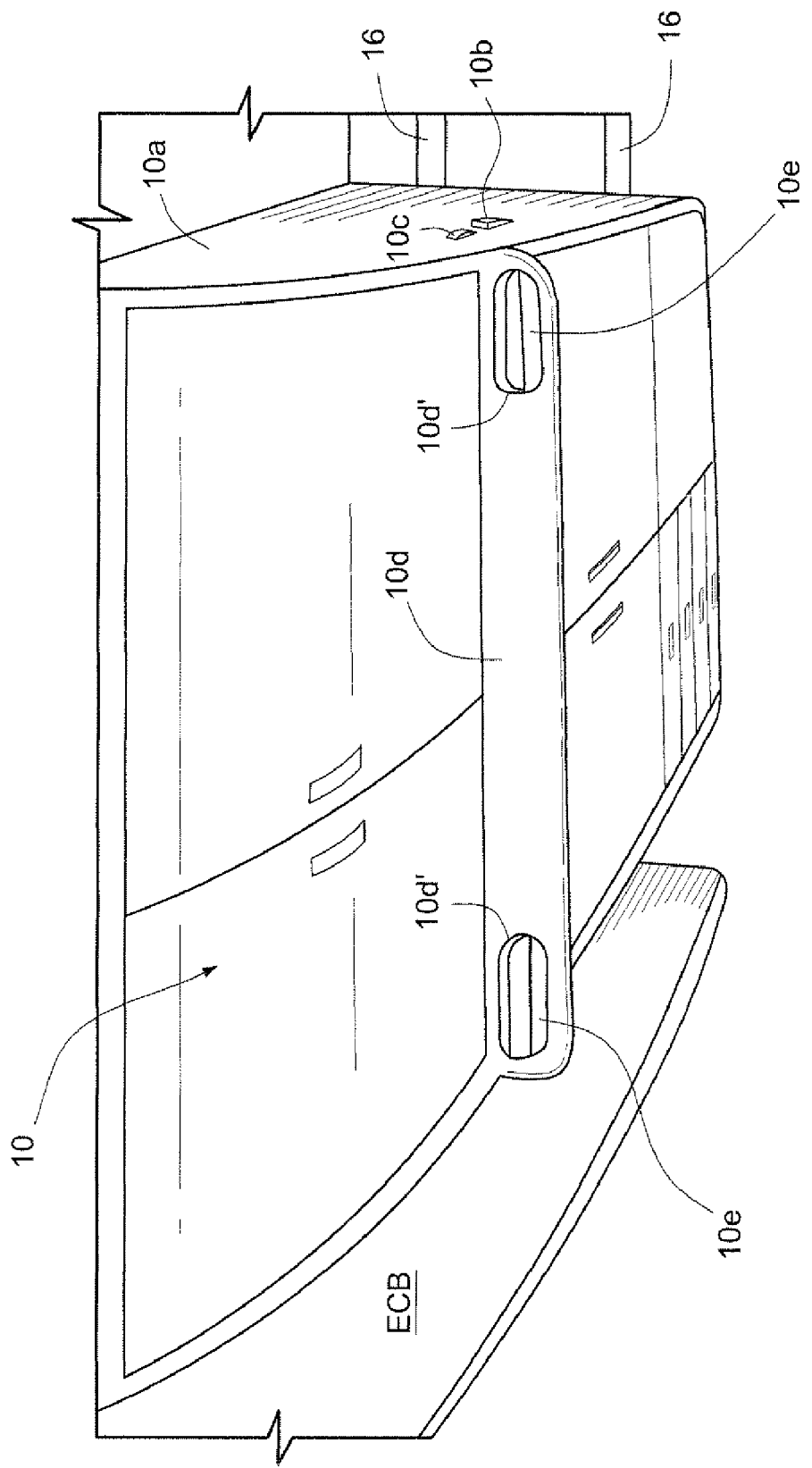
FIG. 8 is a downwardly looking perspective view of the movable galley structure.

Although not shown in the accompanying drawings, the galley structure 10 may be provided with any suitable latch system that will allow it to be positionally locked in its stowed or operative positions. For example, in the embodiments discussed above, the table 12a when in its opened position will serve to forcibly capture the movable galley structure 10 so it is positionally restrained in its operative position. However, virtually any form of latch assemblies associated with the entry cabin bulkhead ECB and the forward cockpit bulkhead FCB may be provided so as to latch the galley structure 10 in its operative and/or stowed positions, respectively. In some preferred embodiments as shown in FIG. 8, the hand hold openings 10d' will be provided with latch release triggers 10e that are operatively interconnected to latch mechanisms (not shown), for example, friction locks associated with the guide rails 16. If employed, such friction locks may thus be operatively released by the spring-biased release triggers 10e associated with the hand hold openings 10d' of the grab bar 10d. Suffice it to say, virtually any form of structural and/or electromechanical latch system can be provided so as to ensure that the galley structure 10 may be positionally yet irremovably locked while in its stowed or operative positions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft galley unit comprising:
   a fixed-position galley structure mounted laterally adjacent to an aircraft cabin door, and
   a movable galley structure mounted for reciprocal movements between a stowed position wherein the moveable galley structure is stacked with and covers the fixed-position galley structure and an operative position wherein the movable galley structure is stacked with and covers the aircraft cabin door and exposes an open space in front of the fixed-position galley structure to thereby allow access to the fixed-position galley structure, wherein
   the fixed-position galley structure includes a table that is pivotally foldable between a closed position wherein the table is substantially vertically oriented, and an opened position wherein the table is substantially horizontally oriented and extends outwardly into the open space in front of the fixed-position galley structure and laterally adjacent to the moveable galley structure when in the operative position thereof, the foldable table thereby positionally locking the moveable galley structure in the operative position thereof so as to prevent moveable translation between the operative position to the stowed position thereof.

2. An aircraft galley unit as in claim 1, further comprising at least one longitudinally extending guide rail, wherein the movable galley structure is mounted to the at least one guide rail for reciprocal longitudinal sliding movements between the stowed and operative positions thereof.

3. An aircraft galley unit as in claim 1, wherein the movable galley structure includes a handle to assist in manual movements of the movable galley structure between the stowed and operative positions thereof.

4. An aircraft galley unit as in claim 3, wherein handle includes a grab bar protruding outwardly from the movable galley unit.

5. An aircraft galley unit as in claim 4, wherein the grab bar includes a pair of hand-hold openings.

6. An aircraft galley unit as in claim 5, wherein at least one of the hand-hold openings includes a latch release trigger.

7. An aircraft galley unit as in claim 1, wherein the movable galley structure includes a support boss to support the table when in the opened position thereof.

8. An aircraft galley unit as in claim 1, wherein the movable galley structure includes a friction lock to releasably lock the table in the opened position thereof.

9. An aircraft which includes an aircraft galley unit as in any one of claims 1-6 and 7-8.

10. A method of providing acoustic and/or thermal insulation for an aircraft cabin door comprising:
    (a) positioning an aircraft galley unit laterally adjacent to the cabin door, wherein the aircraft galley unit comprises a fixed-position galley structure mounted laterally adjacent to an aircraft cabin door, and a movable galley structure mounted for reciprocal movements between a stowed position wherein the moveable galley structure is stacked with and covers the fixed-position galley structure and an operative position wherein the movable galley structure is stacked with and covers the aircraft cabin door and exposes an open space in front of the fixed-position galley structure to thereby allow access to the fixed-position galley structure, wherein the fixed-position galley structure includes a table that is pivotally foldable between a closed position wherein the table is substantially vertically oriented, and an opened position wherein the table is substantially horizontally oriented and extends outwardly into the open space in front of the fixed-position galley structure and laterally adjacent to the moveable galley structure when in the operative position thereof,
    (b) moving the movable galley structure from the stowed position and into the operative position thereof so that the movable galley structure covers the cabin door, and
    (c) moving the table of the fixed-position galley structure from the closed position to the opened position thereof into the open space in front of the fixed-position galley structure so as to positionally lock the moveable galley structure in the operative position thereof and thereby prevent moveable translation between the operative position to the stowed position thereof, whereby the movable galley structure provides acoustic and/or thermal insulation for the cabin door.

11. The method as in claim 10, further comprising moving the movable galley structure along at least one longitudinally extending guide rail for reciprocal longitudinal sliding movements between the stowed and operative positions thereof.

12. The method as in claim 10, which comprises moving the movable galley structure by manually grasping a handle mounted to the movable galley structure to assist in manual movements of the movable galley structure between the stowed and operative positions thereof.

13. The method as in claim 12, wherein handle includes a grab bar protruding outwardly from the movable galley unit.

14. The method as in claim 13, wherein the grab bar includes a pair of hand-hold openings.

15. The method as in claim 5, wherein at least one of the hand-hold openings includes a latch release trigger.

16. The method as in claim 14, further comprising supporting the table in the opened position thereof by a support boss on the moveable galley structure.

17. The method as in claim 10, further comprising providing a friction lock associated operatively with the movable galley structure so as to releasably lock the table in the opened position thereof.

* * * * *